(12) United States Patent
MacInnis et al.

(10) Patent No.: US 8,274,605 B2
(45) Date of Patent: *Sep. 25, 2012

(54) SYSTEM AND METHOD FOR ADJACENT FIELD COMPARISON IN VIDEO PROCESSING

(75) Inventors: Alexander MacInnis, Lake Oswego, OR (US); Sheng Zhong, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1096 days.

This patent is subject to a terminal disclaimer.

(21) Appl. No.: 11/272,116

(22) Filed: Nov. 10, 2005

(65) Prior Publication Data

US 2007/0103588 A1    May 10, 2007

(51) Int. Cl.
*H04N 7/01* (2006.01)
*H04N 11/20* (2006.01)

(52) U.S. Cl. .................... 348/452; 348/448; 348/458

(58) Field of Classification Search .......... 348/441–459, 348/699–702
See application file for complete search history.

(56) References Cited

U.S. PATENT DOCUMENTS

| | | | | |
|---|---|---|---|---|
| 5,936,676 A * | 8/1999 | Ledinh et al. | ................. | 348/452 |
| 6,700,622 B2 * | 3/2004 | Adams et al. | ................. | 348/448 |
| 6,922,214 B1 * | 7/2005 | Weston | ........................ | 348/448 |
| 7,012,649 B2 * | 3/2006 | Michel | ............................ | 348/448 |
| 2004/0061803 A1 * | 4/2004 | Terai | ............................. | 348/441 |
| 2004/0114048 A1 * | 6/2004 | Jung et al. | ..................... | 348/441 |
| 2004/0189865 A1 * | 9/2004 | Chen et al. | .................... | 348/448 |

* cited by examiner

*Primary Examiner* — Michael Lee
(74) *Attorney, Agent, or Firm* — Thomas, Kayden, Horstemeyer & Risley, LLP

(57) ABSTRACT

Methods and systems for processing video information are disclosed herein and may comprise calculating a first two-field difference between a first plurality of pixels from a current field and a second plurality of corresponding pixels from an alternate field adjacent to the current field. At least one pixel from the current field may be deinterlaced based at least in part on the calculated first two-field difference. The first plurality of pixels and the second plurality of pixels may be aligned by adjusting a phase of at least one of the first plurality of pixels and the second plurality of pixels prior to the calculation of the first two-field difference. The first plurality of pixels may include a plurality of vertically adjacent pixels. The first plurality of pixels may comprise at least one luminance component. The alternate field may include a previous field and/or a next field. The first plurality of pixels and the second plurality of pixels may be filtered prior to the calculation of the first two-field difference.

22 Claims, 7 Drawing Sheets

SYSTEM AND METHOD FOR ADJACENT FIELD COMPARISON IN VIDEO PROCESSING

RELATED APPLICATIONS

This application is related to the following applications, each of which is hereby incorporated herein by reference in its entirety for all purposes:
U.S. patent application Ser. No. 11/254,450 filed Oct. 20, 2005;
U.S. patent application Ser. No. 11/254,262 filed Oct. 20, 2005;
U.S. patent application Ser. No. 11/272,113 filed Nov. 10, 2005;
U.S. Provisional Patent Application Ser. No. 60/687,674 filed Jun. 6, 2005;
U.S. patent application Ser. No. 11/272,112 filed Nov. 10, 2005; and
U.S. patent application Ser. No. 11/270,999 filed Nov. 10, 2005.

FIELD OF THE INVENTION

Certain embodiments of the invention relate to processing of video data. More specifically, certain embodiments of the invention relate to a system and method for adjacent field comparison in video processing.

BACKGROUND OF THE INVENTION

During interlacing, pictures that form a video may be captured at two distinct time intervals. These pictures, which may be referred to as fields and which form the video, comprise a plurality of ordered lines. During one of the time intervals, video content for even-numbered lines may be captured, while at a subsequent time interval, video content for odd-numbered lines may be captured. The even-numbered lines may be collectively referred to as a top field, while the odd-numbered lines may be collectively referred to as a bottom field. On an interlaced display, the even-numbered lines may be presented for display on the even-numbered lines of a display during one time interval, while the odd-numbered lines may be presented for display on the odd-numbered lines of the display during a subsequent time interval.

With progressive displays, however, all of the lines of the display are displayed at one time interval. During deinterlacing of interlaced video, a deinterlacing process may generate pictures for display during a single time interval. Deinterlacing by combining content from adjacent fields, which is known as weaving, may be suitable for regions of a picture that are characterized by less object motion or lighting changes, known as inter-field motion. Displaying both the top field and bottom field at the same time interval may be problematic in cases where the video content comprises significant motion or significant lighting changes. Objects that are in motion are at one position when the top field is captured and another position when the bottom field is captured. If the top field and the bottom field are displayed together, a comb-like, or jagged edge effect may appear with the object. This is referred to as a weave artifact.

Alternatively, deinterlacers may generate a picture for progressive display by interpolating missing lines in a field from adjacent and surrounding lines. This is known as spatial interpolation, or "bobbing". While spatial interpolation avoids artifacts in regions with significant inter-field motion, spatial interpolation loses vertical detail and may result in a blurry picture.

Conventional methods for deinterlacing interlaced video often times produce weave artifacts, which may result from incorrectly biasing deinterlacing decisions towards weaving when spatial interpolation may be more appropriate. In addition, conventional deinterlacing methods may often bias deinterlacing decisions towards spatial interpolation when weaving may be a more appropriate method for deinterlacing.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and method for adjacent field comparison in video processing, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for deinterlacing interlaced video signals utilizing a two-field difference. In one embodiment of the invention, a first plurality of vertically adjacent pixels may be selected from a current field and a second plurality of corresponding pixels may be selected from an adjacent field of opposite field polarity, such as a previous field or a subsequent field. The pluralities of corresponding pixels may be filtered so that the vertical phase of the second plurality of pixels is the same as the vertical phase of the first plurality of pixels from the current field. A filter function, such as a low pass filter function, may be utilized to determine a first field difference between the current field and the adjacent field based on the phase-aligned first plurality of pixels and second plurality of corresponding pixels. Additional field differences, such as a second field difference and a third field difference may be determined utilizing a third and a fourth plurality of vertically adjacent pixels in the current field and corresponding pluralities of pixels in the adjacent field.

The third plurality and the fourth plurality of pixels may be horizontally adjacent to the first plurality of pixels. Each of the three determined field differences may be assigned a weight value and a total weighted field difference may be calculated based on the weight values and the corresponding field differences. Furthermore, a weighted field difference may be calculated for a plurality of components of the pixels, for example luminance, chrominance-red, and chrominance-blue pixel components. A total field difference may be calculated based on the weighted field differences for the luminance, chrominance-red, and chrominance-blue pixels. The total field difference may be utilized to indicate the presence of motion, including vertical motion, between adjacent fields and to determine, at least in part, whether and to what extent weaving or spatial interpolation should be utilized to deinterlace pixels within a current video field.

Figure 1A:
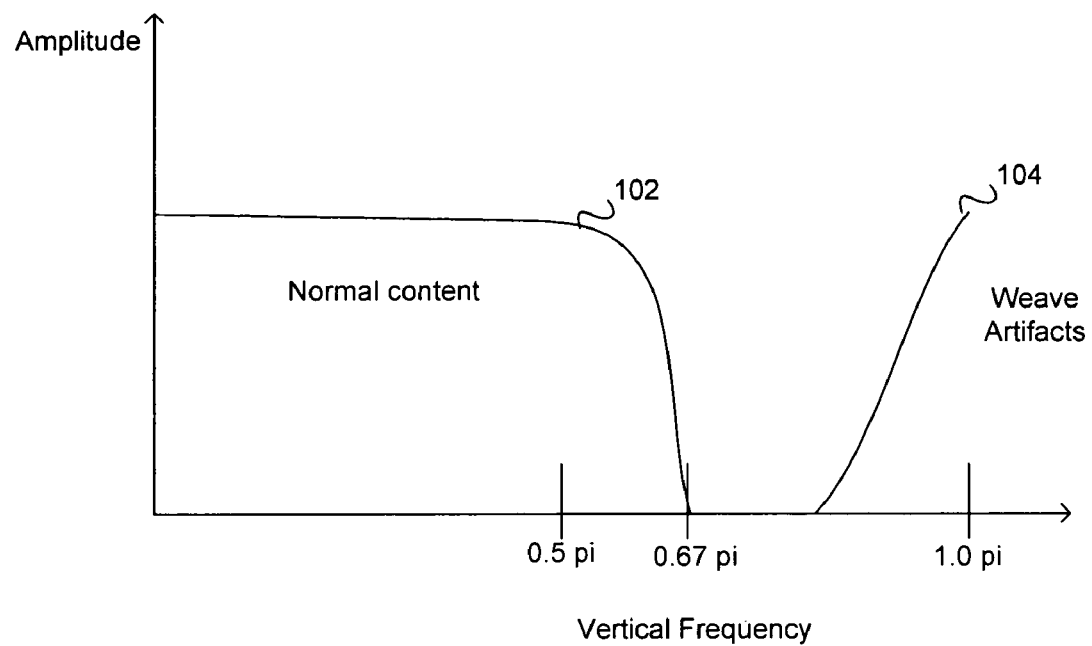
FIG. 1A is a graph illustrating exemplary spectra of video content vertical detail and bad weave artifacts, that may be utilized in accordance with an embodiment of the invention.

FIG. 1A is a graph illustrating exemplary spectra of video content vertical detail and bad weave artifacts that may be utilized in accordance with an embodiment of the invention. Referring to FIG. 1A, the exemplary spectra of video content vertical detail may comprise a normal video content vertical detail spectrum 102, and bad weave artifacts spectrum 104. The normal video content vertical detail spectrum 102 lies substantially at a vertical frequency that is less than or equal to approximately 0.67 pi, while the bad weave artifacts spectrum 104 lies substantially at a vertical frequency that is greater than or equal to approximately 0.8 pi. The Nyquist bandwidth limit for frame sampled video pictures may be referred to as pi. Bad weave artifacts and associated bad weave artifacts spectrum 104 may result from some cases of content motion or content changes. For example, content motion with a horizontal component, or for example vertical motion of content with a diagonal edge, may result in a bad weave artifacts spectrum. Also for example, changing content brightness such as a fade, dissolve, or changing lighting for example may result in a bad weave artifacts spectrum. Bad weave artifacts and associated spectra are further discussed in U.S. patent application Ser. No. 11/254,262, filed Oct. 20, 2005, which is incorporated herein by reference in its entirety.

One goal of deinterlacing is to mitigate or eliminate the bad weave artifacts spectrum 104. In an exemplary aspect of the invention, a two-field difference value may be calculated for a plurality of pixels from different fields, which may be selected from a plurality of weaved video fields. The video fields may then be deinterlaced utilizing weaving and/or spatial interpolation based at least in part on the calculated two-field difference value so that bad weave artifacts, as illustrated in the bad weave artifacts spectrum 104, may be avoided.

Motion, such as vertical motion for example, between adjacent fields may be detected via the two-field difference value and spatial interpolation may be conditionally utilized in order to prevent the occurrence of visible weave artifacts, or "bad weaves," when the adjacent fields are deinterlaced. The conditional use of spatial interpolation may be used in lieu of weaving where significant inter-field differences are detected. For static imagery with high vertical frequency detail but no objectionable flicker on an interlaced display, the vertical bandwidth may be determined by the Kell factor, which may be considered to be between about 0.6 and 0.7 as illustrated in FIG. 1A. That is, the maximum vertical spectral component that results in perceived detail and not perceived flicker is generally between about 0.6 and 0.7 of the frame Nyquist limit. The Nyquist limit for any one field of video may be calculated as one half the frame Nyquist limit, since fields have half the vertical sample rate of frames. The frame Nyquist limit may also be referred to as 1.0 pi.

In one embodiment of the invention, the two-field difference value calculated for a plurality of current pixels in a current pair of fields may be utilized as an indication of an amount of motion, such as vertical motion, between adjacent fields. In this regard, the two-field difference value may be used to determine an amount of spatial interpolation and an amount of weaving which may be utilized to deinterlace the plurality of pixels in the current frame.

Figure 1B:
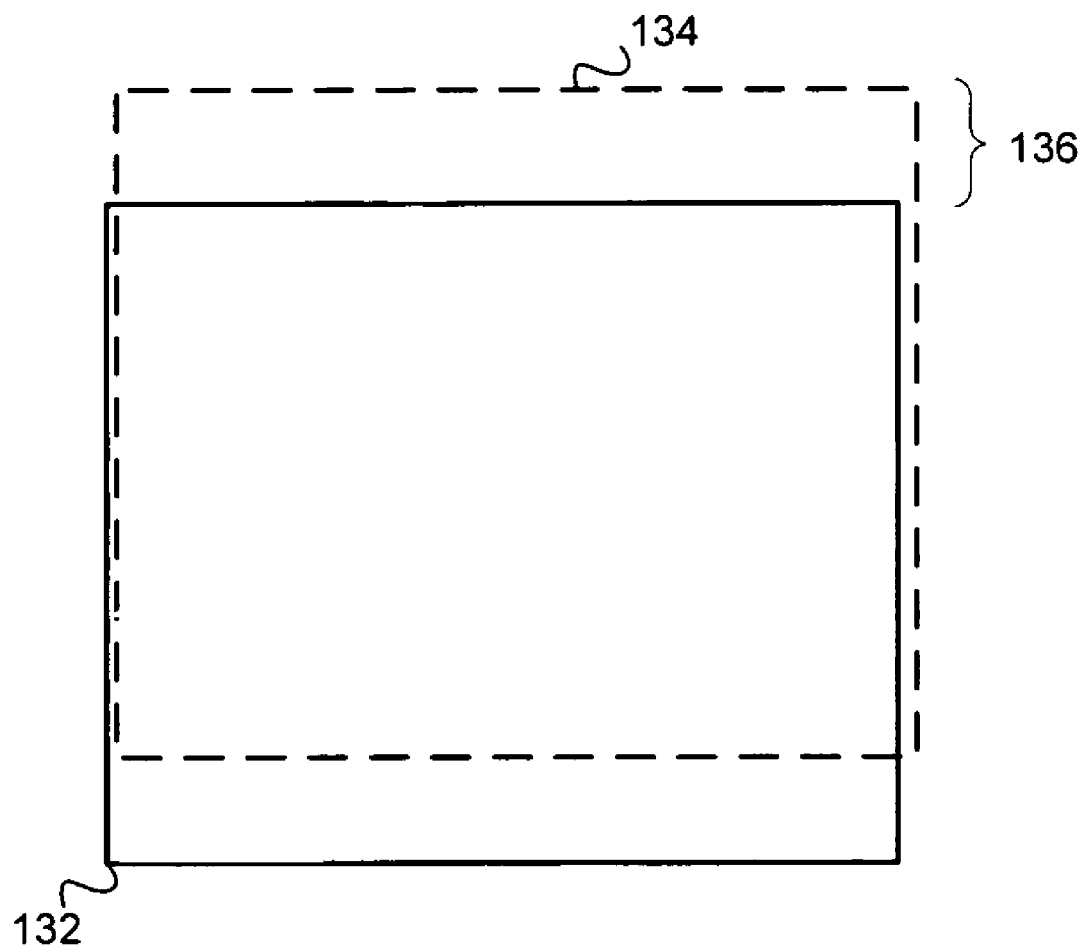
FIG. 1B is a diagram illustrating vertical movement of an object in adjacent fields, in accordance with an embodiment of the invention.

Consider, for example, the case of a white rectangular object moving against a black background, in interlaced video. FIG. 1B is a diagram illustrating vertical movement of an object in adjacent fields, in accordance with an embodiment of the invention. Referring to FIG. 1B, the image of a rectangular object 132 may have a first location in a previous field in an interlaced video signal, for example, and a corresponding image 134 of object 132 may have a second location in a current field in the interlaced video signal. In this regard, object 134 in the current video field may correspond to object 132 in the previous field and may be obtained as a result of vertical movement by object 132 between the fields.

In any one field within the interlaced video signal, if the missing lines were filled in using the previous field, i.e. using pure weaving, erroneous appearing lines would appear at the edges of the white object corresponding to the movement between the fields, such as area 136 in FIG. 1B. Area 136 may be representative of bad weave artifacts when vertical motion of pixels is present between adjacent fields of the interlaced video signal.

In one embodiment of the invention, a measure of the motion between adjacent fields, such as the vertical motion for example, between the corresponding objects 132 and 136 in the previous and current fields, respectively, may be calculated and utilized at least in part to determine whether weaving, spatial interpolation, or a mixture thereof, may be used for deinterlacing. The measure of motion between the adjacent fields may be based on a difference between the adjacent fields and may be calculated by utilizing a plurality of corresponding pixels within the adjacent fields. This measure may be referred to as a two-field difference.

Figure 2:
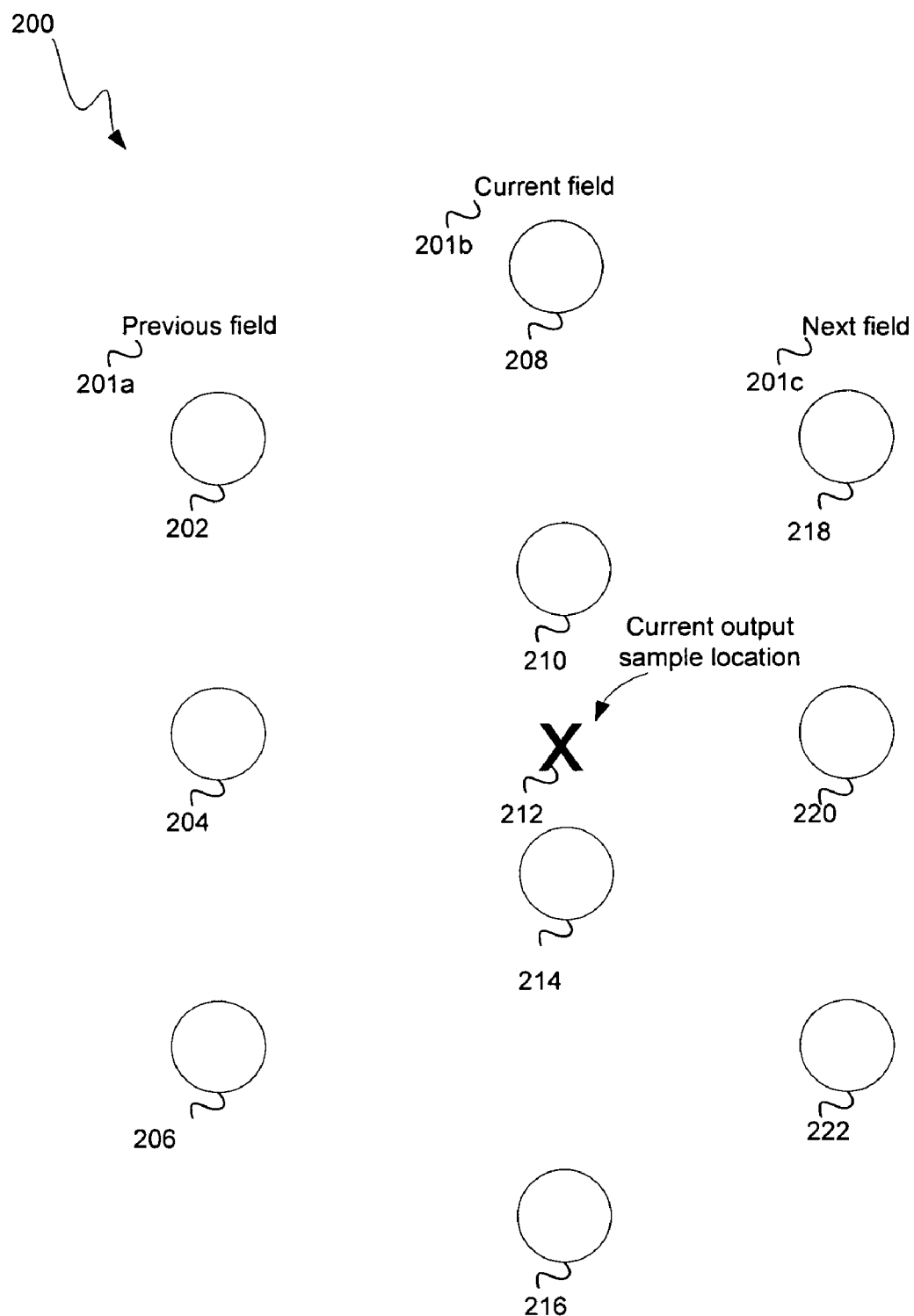
FIG. 2 is a diagram illustrating exemplary selection of pixel samples from current and adjacent fields for a two-field difference calculation, in accordance with an embodiment of the invention.

FIG. 2 is a diagram illustrating exemplary selection of pixel samples from current and adjacent fields for a two-field difference calculation, in accordance with an embodiment of the invention. Referring to FIG. 2, pixel samples 202, . . . , 216 may be selected for calculation of a two-field difference value and may comprise pixels from two adjacent fields, such as the current field 201b and the previous field 201a. After weaving, fields 201a and 201b may form a video frame comprising vertically adjacent pixels 202, . . . , 216 selected from the adjacent fields 201a and 201b. For example, current output sample location 212 may be a location that is not represented by any sample in the current field. Such a location may be referred to as a missing sample. For example, pixel samples 210 and 214 may be selected from the current field 201b so that pixel samples 210 and 214 may be located immediately above and below, respectively, to a current output sample location 212 within the current field 201b. Pixel samples 208 and 216 may also be selected from the current field 201b so that pixel sample 208 may be located immediately above pixel sample 210, and pixel sample 216 may be located immediately below pixel sample 214.

In addition to pixel samples 208, ..., 216 selected from the current field 201b, corresponding pixel samples 202, ..., 206 may be selected from the previous field 201a for calculation of the two-field difference value. For example, pixel sample 204 may be selected from the previous field 201a so that pixel sample 204 corresponds to the current output sample location 212. Pixel samples 202 and 206 may be selected from the previous field 201a so that pixel samples 202 and 206 may be located immediately above and below, respectively, to the pixel sample 204 within the previous field 201a.

In an exemplary aspect of the invention, a two-field difference value may be calculated for pixels 202, ..., 216 from the previous field 201a and the current field 201b. Since the vertical positions of pixels within the previous field 201a are not aligned with the vertical positions of pixels within the current field 201b, a filter may be applied to shift the vertical phase of pixels 202, ..., 206 so that pixels 202, ..., 206 may be aligned with pixels 208, ..., 216 within the current field 201b. Alternatively, a filter may be applied to shift the vertical phase of pixels 208, ..., 216 so that they may be aligned with pixels 202, ..., 206 within the previous field 201a. Alternatively filters may be applied to pixels 208, ..., 216 and to pixels 202, ..., 206 such that the resulting values are vertically aligned. A two-field difference value may then be determined by calculating a difference between the current field 201b and the previous field 201a utilizing the phase-aligned filtered results from pixels 202, ..., 216.

In one embodiment of the invention, low-pass filter functions, for example, may be performed on both the current field 201b and the previous field 201a, and the low pass filter functions may comprise the vertical phase shift function applied to the respective pixels from the two fields. A four-tap filter, for example, may be utilized to filter and phase shift the four pixel samples 208, ..., 216 within the current field 201b, and a three-tap filter may be utilized to filter the three pixels samples 202, ..., 206 within the previous field 201a. It may be desirable to utilize filters that provide similar frequency responses for the current and alternate fields. For example, the pixel samples 208, ..., 216 may be multiplied by respective coefficients (30, 108, 108, 30) and the results summed in order to perform low pass filtering and phase shifting, and the samples (202, 204, 206) may be multiplied by respective coefficients (75, 126, 75) and the results summed in order to perform low pass filtering. A two-field difference may then be determined by calculating a difference between the filtered pixel values, for example, of pixels 208, ..., 216 within the current field 201b and corresponding phase-aligned filtered pixels 202, ..., 206 within the previous field 201a. An absolute value function may be applied to the two-field difference value.

The two-field difference value may be utilized to measure motion between adjacent fields, such as the current field 201b and the previous field 201a. The absolute value of the two-field difference value may be so utilized. Accordingly, the two-field difference value may be utilized to determine whether to deinterlace video fields 201a and 201b utilizing weaving, if the two-field difference value is low, or spatial interpolation, if the two-field difference value is high, or the two-field difference value may be utilized at least in part to determine the degree to which spatial interpolation and weaving are used to de-interlace video fields 201a and 201b. The two-field difference may be utilized, either alone or in combination with other measures, to determine whether and to what extent to utilize spatial interpolation and weaving in de-interlacing.

In one embodiment of the invention, a two-field difference value may be calculated for each of a luminance (Y), chrominance-red (Cr), and chrominance-blue (Cb) components of pixel samples within a current and an adjacent field. A total two-field difference value may then be calculated utilizing the two-field difference values calculated for the luminance, chrominance-red, and chrominance-blue components of the pixel samples within the current and the adjacent field.

Even though the two-field difference value illustrated in FIG. 2 is calculated utilizing the current field 201b and the previous field 201a, the present invention may not be so limited and a next adjacent field 201c may be utilized in place of the previous field 201a. For example, pixel samples 218, ..., 222 may be selected from the next field 201c, adjacent to the current field 201a, for calculation of the two-field difference value. In this regard, pixel sample 220 may be selected from the next field 201c so that pixel sample 220 corresponds to the current pixel sample 212. Pixel samples 218 and 222 may be selected from the next field 201c so that pixel samples 218 and 222 may be located immediately above and below, respectively, to the pixel sample 220 within the next field 201c.

Alternatively, two sets of two-field difference values may be calculated, a first difference value for the difference between the current field and the previous field, and a second difference value for the difference between the current field and the next field. The absolute values of each of these difference values may be taken. The resulting difference values may be combined using a linear or non-linear combination function, and the combination may be utilized at least in part for determining aspects of a de-interlacing operation performed on the current field and at least one of the previous field and the next field. For example, if the absolute difference value between the current field and a first adjacent field is lower than the absolute difference value between the current field and a second adjacent field, the first adjacent field may be utilized for weaving operations. Alternatively, for example, if the absolute difference between the two difference values is small, both adjacent fields may be utilized for weaving operations.

In another embodiment of the invention, a two-field difference value may be calculated for a plurality of horizontally adjacent columns of pixel samples within a current field 201b and an adjacent field, such as a previous field 201a or a next field 201c. For example, two columns of pixel samples, a previous and a next pixel column, may be selected from the current field 201b so that the selected two columns of pixel samples are adjacent to the column of pixel samples comprising pixels 208, ..., 216. Corresponding previous and next pixel columns may be selected from an adjacent field and a two-field difference value may be calculated for each pair of corresponding pixel columns within the current field 201b and the adjacent field 201a or 201c. A total two-field difference value may be calculated based on the two-field difference values for each pixel column selected from the current field 201b.

In an exemplary embodiment of the invention, after a two-field difference value is calculated, the two-field difference may be compared to a first and a second threshold value, and the comparison may be utilized, at least in part, to determine whether weaving or spatial interpolation may be utilized to minimize bad weave artifacts and maximize vertical resolution. For example, if the two-field difference value is close to or greater than a first threshold value, such as 1, the two-field difference value may indicate the presence of motion between adjacent fields. In this case, the adjacent fields may be deinterlaced utilizing spatial interpolation. Similarly, if the two-field difference value is close to or less than a second threshold value, such as 0, the two-field difference value may indicate absence of motion between the adjacent fields. In this case, the adjacent fields may be deinterlaced utilizing weaving. In one aspect of the invention, if the two-field difference value is between the first threshold and the second threshold, the two-field difference value may be utilized to generate a blend control value. The adjacent fields may then be deinterlaced utilizing both weaving and spatial interpolation, based at least in part on the blend control value.

Figure 3:
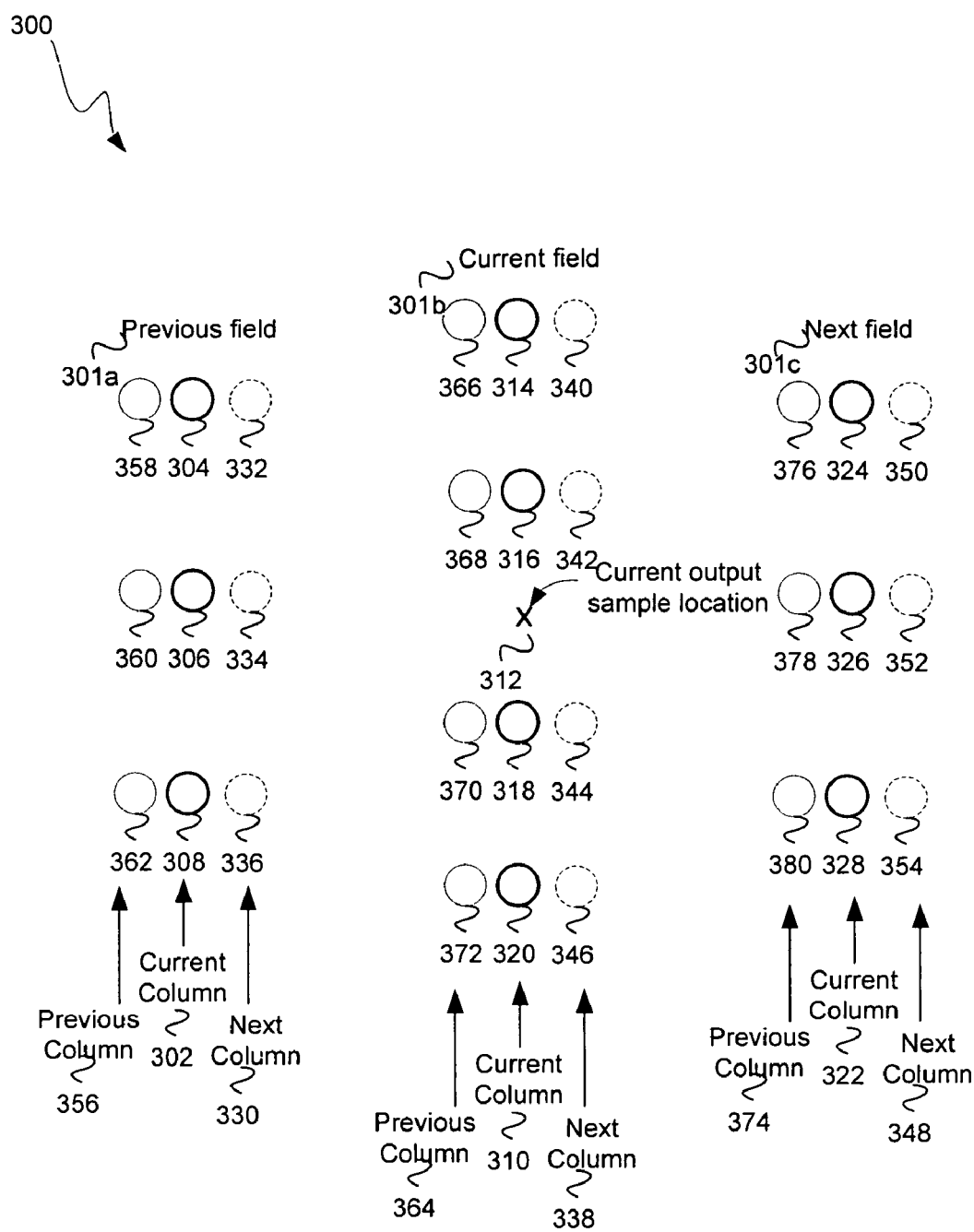
FIG. 3 is a diagram illustrating exemplary selection of pixel samples from current and adjacent fields for a two-field difference calculation, in accordance with an embodiment of the invention.

FIG. 3 is a diagram illustrating exemplary selection of pixel samples from current and adjacent fields for a two-field difference calculation, in accordance with an embodiment of the invention. Referring to FIG. 3, a plurality of pixel samples may be selected from the current field 301b and a corresponding plurality of pixel samples may be selected from the previous field 301a for calculation of a two-field difference value. For example, pixel samples from the current field 301b may comprise vertically adjacent pixels 314, ..., 320 within a current pixel column 310. Pixel samples 314 and 316 may be located above a current output sample location 312, and pixel samples 318 and 320 may be located below the current output sample location 312. In addition, pixel samples from the current field may also comprise vertically adjacent pixel samples 366, ..., 372 within a previous pixel column 364 within the current field 301b, and vertically adjacent pixel samples 340, ..., 346 within a next pixel column 338 within the current field 301b. The previous pixel column 364 and the next pixel column 338 may be horizontally adjacent to the current pixel column 310.

In addition to the pixel samples selected from the current field 301b, corresponding pixel samples may be selected from the previous field 301a for calculation of the two-field difference value. For example, pixel sample 306 within a current pixel column 302 may be selected from the previous field 301a so that pixel sample 306 corresponds to the current output sample location 312. Pixel samples 304 and 308 may be selected from the previous field 301a so that pixel samples 304 and 308 may be located immediately above and below, respectively, to the pixel sample 306 within the current column 302 in the previous field 301a. Furthermore, pixels 332, ..., 336 may be selected in a next column 330 within the previous field 301a so that the next pixel column 330 corresponds to the next pixel column 338 within the current field 301b. Similarly, pixels 358, ..., 362 may be selected in a previous column 356 within the previous field 301a so that the previous pixel column 356 corresponds to the previous pixel column 364 within the current field 301b.

In an exemplary aspect of the invention, a two-field difference value may be calculated for each of the pixel column pairs 310-302, 364-356, and 338-330 utilizing calculation techniques as described above herein with respect to the two-field difference calculation of the current field 201b and the previous field 201a in FIG. 2. After a two-field difference value is calculated for each of the column pairs 310-302, 364-356, and 338-330, a filter function, for example, may be applied to each of the two-field difference values to calculate a total two-field difference value. For example, the two-field difference value for column pair 310-302 may be multiplied by a weight of 0.5, and the two-field difference values for column pairs 364-356 and 338-330 may each be multiplied by a weight of 0.25. A total two-field difference value may be calculated by adding the filtered, or multiplied two-field difference values for column pairs 310-302, 364-356, and 338-330. An absolute value function may be applied to the resulting total two-field difference value.

Even though the two-field difference value illustrated in FIG. 3 is calculated utilizing the current field 301b and the previous field 301a, the present invention may not be so limited and a next adjacent field 301c may be utilized in place of the previous field 301a. For example, pixel sample 326 within a current pixel column 322 may be selected from the next field 301c so that pixel sample 326 corresponds to the current output sample location 312 within the current field 301b. Pixel samples 324 and 328 may be selected from the next field 301c so that pixel samples 324 and 328 may be located immediately above and below, respectively, to the pixel sample 326 within the current column 322 in the next field 301c. Furthermore, pixels 350, ..., 354 may be selected in a next column 348 within the next field 301c so that the next pixel column 348 corresponds to the next pixel column 338 within the current field 301b. Similarly, pixels 376, ..., 380 may be selected in a previous column 374 within the next field 301c so that the previous pixel column 374 corresponds to the previous pixel column 364 within the current field 301b. Alternatively, both the two-field difference value calculated using the current field 301b and the previous field 301a, and the two-field difference value calculated using the current field 301b and the next field 301c, may be calculated. Both two-field difference values may be utilized in de-interlacing operations.

In one embodiment of the invention, the two-field difference value may be utilized, as a measure of motion within a plurality of fields, for calculation of a master blend control value. U.S. patent application Ser. No. 11/272,113 discloses a system and method for blending spatial interpolation and weaving and is incorporated herein by reference in its entirety.

Selecting one or more fields for de-interlacing using multi-valued weighted summing of weaving and spatial interpolation values is described in U.S. Provisional Patent Application Ser. No. 60/687,674, filed Jun. 6, 2005, which is incorporated herein by reference in its entirety.

A master blend control value may be calculated based on a polarity change count (PCC) value, a vertical gradient value, a two-field difference value, and a static region value. The PCC may be utilized as a measure of horizontal motion between adjacent fields. U.S. patent application Ser. No. 11/254,450 discloses a system and method for polarity change count (PCC) and is incorporated herein by reference in its entirety. U.S. patent application Ser. No. 11/254,262 discloses a method and system for deinterlacing using polarity change count and is incorporated herein by reference in its entirety.

The vertical gradient value and the two-field difference value may be utilized as measures of vertical motion between adjacent fields. U.S. patent application Ser. No. 11/270,999 discloses a system and method for vertical gradient detection in video processing and is incorporated herein by reference in its entirety. The static region value may be utilized as a measure of absence of motion between adjacent video fields. U.S. patent application Ser. No. 11/272,112 discloses a system and method for static region detection and is incorporated herein by reference in its entirety. In this regard, the master blend control value may be utilized to determine an amount of weaving and an amount of spatial interpolation that may be utilized during deinterlacing of pixels in adjacent video fields.

Figure 4:
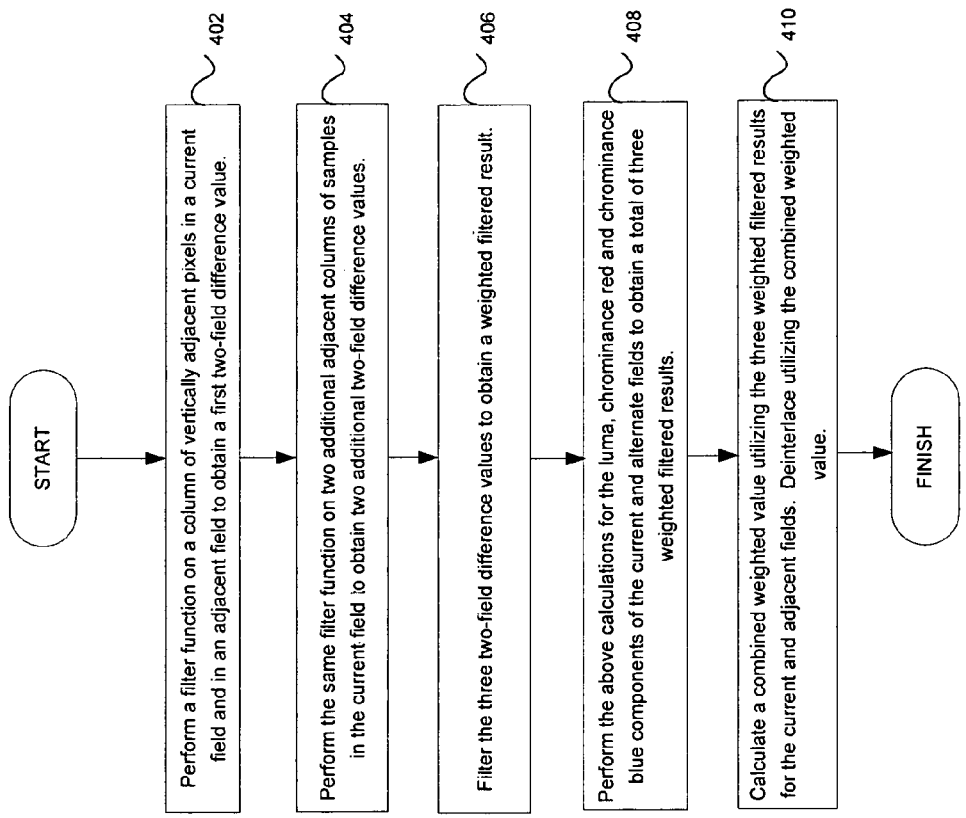
FIG. 4 is a flow diagram illustrating exemplary steps for deinterlacing utilizing a two-field difference, in accordance with an embodiment of the invention.

FIG. 4 is a flow diagram illustrating exemplary steps for deinterlacing utilizing a two-field difference, in accordance with an embodiment of the invention. Referring to FIGS. 3 and 4, at 402, a filter function may be performed on the current column 310 of vertically adjacent pixels within the current field 301b and the current column 302 within the previous field 301a to obtain a first two-field difference value. At 404, the same filter function may be performed on two additional pairs of corresponding pixel columns, such as column pairs 338-330 and 364-356, to obtain two additional two-field difference values. At 406, the three two-field difference values may be filtered to obtain a weighted filtered result. For example, the first two-field difference value may be multiplied by a weight of 0.5, and the additional two-field difference values may be multiplied by a weight of 0.25. At 408, the above calculations may be performed for the luma, chrominance-red and chrominance-blue components of the current field 301b and the previous field 301a to obtain a total of three weighted filtered results. At 410, a combined weighted value may be calculated utilizing the three weighted filtered results for the current field 301b and the previous field 301a. The current field 301b may then be deinterlaced utilizing spatial interpolation and/or weaving, based at least in part on the calculated combined total value.

Figure 5:
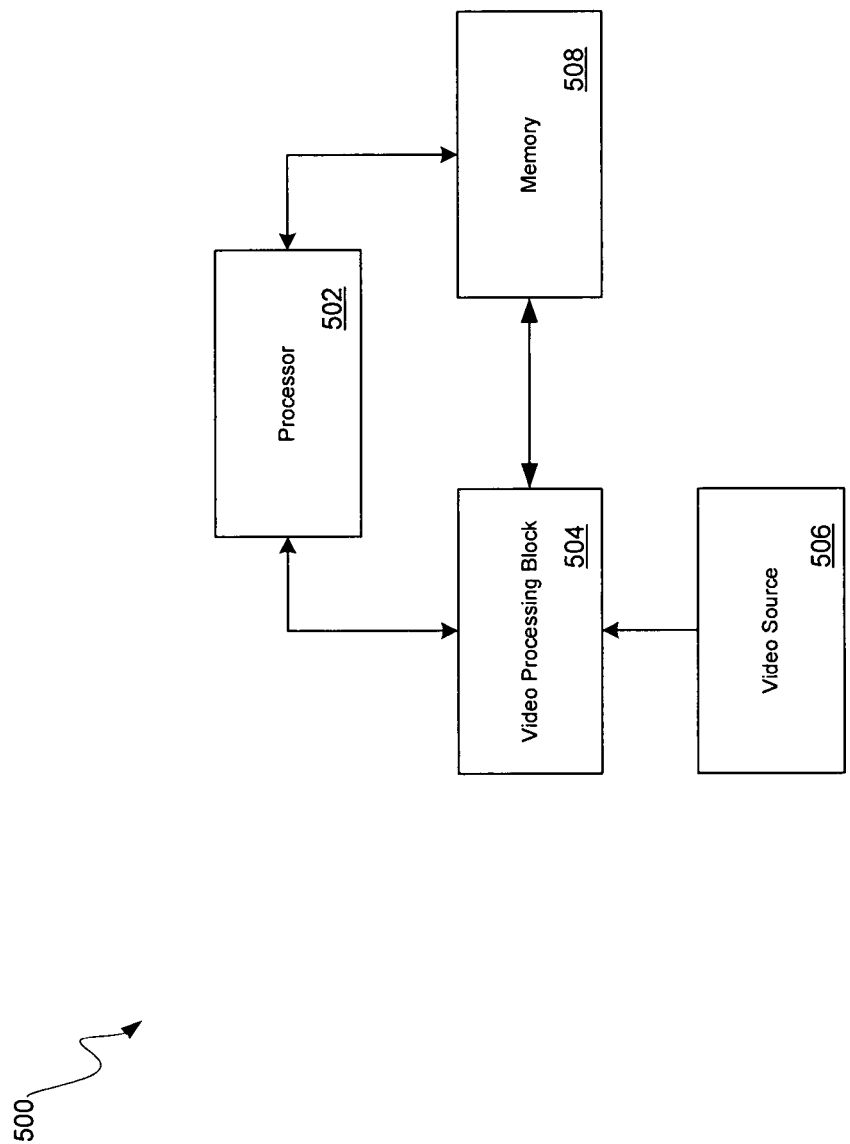
FIG. 5 is a block diagram of an exemplary system for deinterlacing utilizing a two-field difference, in accordance with an embodiment of the invention.

FIG. 5 is a block diagram of an exemplary system for deinterlacing utilizing a two-field difference, in accordance with an embodiment of the invention. Referring to FIG. 5, the exemplary system 500 may comprise a processor 502, a video processing block 504, memory 508, and a video source 506. The video source 506 may comprise suitable circuitry, logic, and/or code and may be adapted to communicate raw video stream data, for example, to the video processing block 504. The video processing block 504 may comprise suitable circuitry, logic, and/or code and may be adapted to process the raw video data received from the video source 506. For example, the video processing block 504 may be adapted to deinterlace interlaced video data received from the video source 506. In this regard, the video processing block 504 may be implemented as a specialized video processing chip. Alternatively, the video processing block 504 may be implemented as a video processing function within a chip that also includes other functions.

The processor 502 may comprise suitable circuitry, logic, and/or code and may be adapted to control processing of video information by the video processing block 504, for example. The processor 502 may comprise a system or a host processor, or a video processor such as a video processing chip or embedded video processor core. The video processor may be integrated in any device that may be utilized to generate video signals and/or display video. The memory 508 may be adapted to store raw or processed video data, such as video data processed by the video processing block 504 or video data input to the video processing block 504. Furthermore, the memory 508 may be utilized to store code that may be executed by the processor 502 in connection with video processing tasks performed by the video processing block 504. For example, the memory 508 may store code that may be utilized by the processor 502 and the video processing block 504 for calculating a two-field difference value and utilizing the calculated two-field difference value during deinterlacing of interlaced video received from the video source 506.

Figure 6:
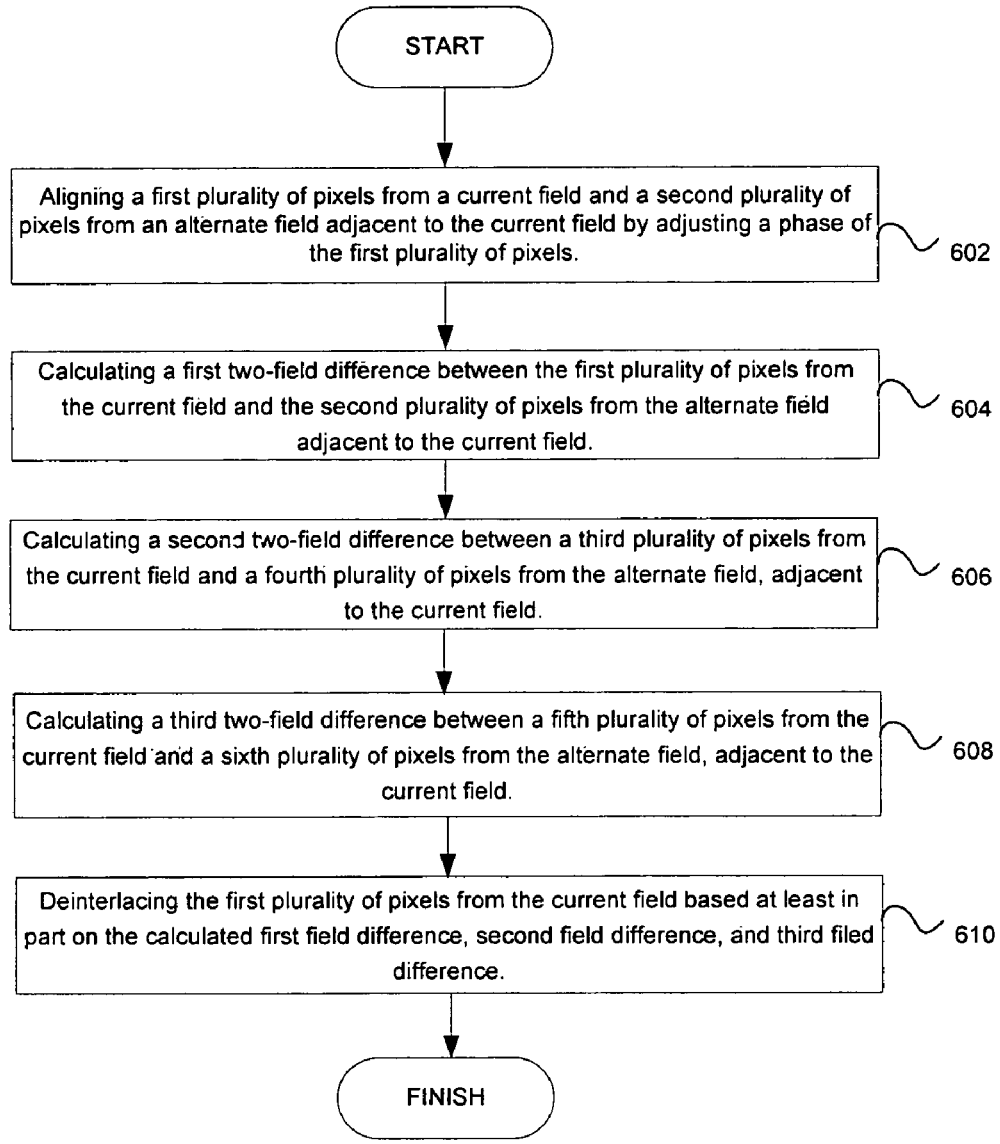
FIG. 6 is a flow diagram illustrating exemplary steps for processing video information, in accordance with an embodiment of the invention.

FIG. 6 is a flow diagram illustrating exemplary steps for processing video information, in accordance with an embodiment of the invention. Referring to FIGS. 3 and 6, at 602, a first plurality of pixels from a current column 310 in a current field 301b and a second plurality of pixels from a corresponding column 302 in an alternate field 301a may be aligned. For example, phase-alignment may be achieved by adjusting a phase of the first plurality of pixels from the current column. At 604, a first two-field difference may be calculated between the pixels from the current column 310 in the current field 301b and corresponding pixels from the current column 302 in the previous field 301a. At 606, a second two-field difference may be calculated between the pixels from the previous column 364 in the current field 301b and corresponding pixels from the previous column 356 in the previous field 301a. At 608, a third two-field difference may be calculated between the pixels from the next column 338 in the current field 301b and corresponding pixels from the next column 330 in the previous field 301a. At 610, the pixels within the current column 310 in the current field 301b may be deinterlaced based at least in part on the calculated first two-field difference, second two-field difference, and third two-field difference.

Accordingly, aspects of the invention may be realized in hardware, software, firmware, or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system may primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:
1. A method for processing video information, the method comprising:
    performing by one or more processors, one or more circuits, or any combination thereof integrated within a single chip:

calculating a first two-field difference between a first plurality of pixels from a current field and a second plurality of corresponding pixels from an alternate field adjacent to said current field;

filtering said first two-field difference to obtain a first weighted filtered result; and removing artifacts by deinterlacing, using one or more of a plurality of deinterlacing methods, at least one pixel from said current field, said one or more of a plurality of deinterlacing methods selected based at least in part on said calculated first weighted filtered result.

2. The method according to claim 1, comprising aligning said first plurality of pixels and said second plurality of pixels by adjusting a phase of at least one of said first plurality of pixels and said second plurality of pixels prior to said calculation of said first two-field difference.

3. The method according to claim 1, wherein said first plurality of pixels comprises a plurality of vertically adjacent pixels.

4. The method according to claim 1, wherein said alternate field comprises one or both of a previous field or a next field.

5. The method according to claim 1, comprising filtering said first plurality of pixels and said second plurality of pixels, prior to said calculation of said first two-field difference.

6. The method according to claim 1, wherein said first plurality of pixels comprises a plurality of vertically adjacent pixels and a plurality of pixels horizontally adjacent to said plurality of vertically adjacent pixels.

7. The method according to claim 6, comprising calculating a plurality of two-field differences between said plurality of vertically adjacent pixels and said plurality of pixels horizontally adjacent to said plurality of vertically adjacent pixels in said current field, and a plurality of corresponding pixels from said alternate field.

8. The method according to claim 7, comprising deinterlacing at least one pixel from said current field based at least in part on said calculated plurality of two-field differences.

9. The method according to claim 1, wherein said first plurality of pixels comprises at least one chrominance component.

10. The method according to claim 1, wherein said first plurality of pixels comprises at least one luminance component.

11. A method for processing video information, the method comprising:
performing by one or more processors, one or more circuits, or any combination thereof integrated within a single chip:
calculating a first two-field difference between a first plurality of pixels from a current field and a second plurality of corresponding pixels from a first alternate field adjacent to said current field;
calculating a second two-field difference between said first plurality of pixels from said current field and a third plurality of corresponding pixels from a second alternate field adjacent to said current field;
filtering said first two-field difference to obtain a first weighted filtered result;
filtering said second two-field difference to obtain a second weighted filtered result; and
removing artifacts by deinterlacing at least one pixel from said current field based at least in part on said calculated first weighted filtered result and said calculated second weighted filtered result.

12. A system for processing video information, the system comprising:
at least one processor that enables calculation of a first two-field difference between a first plurality of pixels from a current field and a second plurality of corresponding pixels from an alternate field adjacent to said current field;
said at least one processor enables filtering of said first two-field difference to obtain a first weighted filtered result; and
said at least one processor enables removing artifacts by deinterlacing, using one or more of a plurality of deinterlacing methods, at least one pixel from said current field, said one or more of a plurality of deinterlacing methods selected based at least in part on said calculated first weighted filtered result.

13. The system according to claim 12, wherein said at least one processor enables aligning of said first plurality of pixels and said second plurality of pixels by adjusting a phase of at least one of said first plurality of pixels and said second plurality of pixels prior to said calculation of said first two-field difference.

14. The system according to claim 12, wherein said first plurality of pixels comprises a plurality of vertically adjacent pixels.

15. The system according to claim 12, wherein said alternate field comprises one or both of a previous field or a next field.

16. The system according to claim 12, wherein said at least one processor enables filtering of said first plurality of pixels and said second plurality of pixels, prior to said calculation of said first two-field difference.

17. The system according to claim 12, wherein said first plurality of pixels comprises a plurality of vertically adjacent pixels and a plurality of pixels horizontally adjacent to said plurality of vertically adjacent pixels.

18. The system according to claim 17, wherein said at least one processor enables calculation of a plurality of two-field differences between said plurality of vertically adjacent pixels and said plurality of pixels horizontally adjacent to said plurality of vertically adjacent pixels in said current field, and a plurality of corresponding pixels from said alternate field.

19. The system according to claim 18, wherein said at least one processor enables deinterlacing of at least one pixel from said current field based at least in part on said calculated plurality of two-field differences.

20. The system according to claim 12, wherein said first plurality of pixels comprises at least one chrominance component.

21. The system according to claim 12, wherein said first plurality of pixels comprises at least one luminance component.

22. A system for processing video information, the system comprising:
at least one processor that enables calculation of a first two-field difference between a first plurality of pixels from a current field and a second plurality of corresponding pixels from a first alternate field adjacent to said current field;
said at least one processor enables calculation of a second two-field difference between said first plurality of pixels from said current field and a third plurality of corresponding pixels from a second alternate field adjacent to said current field;
said at least one processor enables filtering of said first two-field difference to obtain a first weighted filtered result;

said at least one processor enables filtering of said second two-field difference to obtain a second weighted filtered result; and said at least one processor enables removing artifacts by deinterlacing of at least one pixel from said current field based at least in part on said calculated first weighted filtered result and said calculated second weighted filtered result.

* * * * *